United States Patent [19]
Helton et al.

[11] 3,800,120
[45] Mar. 26, 1974

[54] FLUX CORED ELECTRODE

[76] Inventors: Donald C. Helton, 305 Tri Hill Rd., York, Pa. 17403; Robert C. Steveling, 426 N. George St., Hanover, Pa. 17331

[22] Filed: May 26, 1972

[21] Appl. No.: 257,395

[52] U.S. Cl. ............................ 219/146, 219/137
[51] Int. Cl. ............................................ B23k 35/22
[58] Field of Search ............ 219/137, 145, 146, 73; 148/24, 26; 117/202, 207

[56] References Cited
UNITED STATES PATENTS

| | | |
|---|---|---|
| 2,951,931 | 9/1960 | Danhier .......................... 219/146 |
| 3,253,120 | 5/1966 | Claussen ......................... 219/137 |
| 3,621,188 | 11/1971 | Joseph ............................ 219/146 |
| 3,596,054 | 7/1971 | Pokhodnya ..................... 219/146 |
| 3,539,765 | 11/1970 | Duttera .......................... 219/146 |

*Primary Examiner*—J. V. Truhe
*Assistant Examiner*—Gale R. Peterson
*Attorney, Agent, or Firm*—N. M. Esser

[57] ABSTRACT

A continuous welding electrode for vertical or overhead welding consisting of a steel sheath and a flux core wherein the flux core ingredients produce a slag of high viscosity at, and just below, welding temperatures.

11 Claims, No Drawings

FLUX CORED ELECTRODE

BACKGROUND OF THE INVENTION

The arc welding process employing flux-cored electrodes is designed for welding ferrous metals. The equipment for flux-cored arc welding generally consists of a D.C. constant-voltage power source, a controlled wirefeeder, and a welding gun or welding head. Weld metal shielding is obtained from the flux-core of the electrode and the arc and by a supplementary externally supplied gas or gas mixture. This process results in a deeply penetrating arc which has great economic advantages. It reduces edge preparation for butt joints to a minimum and requires considerably less weld metal with less welding time to complete the weld joints. The greater penetration of the arc permits more economical smaller fillet welds to have comparable strength and load carrying capacity to larger size fillets made with the conventional low penetrating shielded metal arc process.

The flux-cored arc welding process offers weld quality and welding speeds comparable to the submerged arc welding process without being handicapped by loose granular flux. It has the advantage of allowing the welder to see the welding area and to control the process.

The flux-cored continuous electrode such as that of Bernard et al., U. S. Pat. No. 3,051,822, has an established and growing use in the welding consumable field but generally has been used in the horizontal and flat welding positions, and largely for in-plant applications. According to the prior art, out-of-position welds were made with the conventional coated manual stick electrode, commonly known as the shielded metal-arc process. Also, bare or copper coated solid steel electrodes have been used with the gas metal-arc process to increase welding speeds and eliminate the need for several stops to change electrodes, but this process has the disadvantage of requiring a highly skilled operator to overcome the tendency for cold lapping or lack of fusion. Out-of-position welding with flux-cored continuous wire electrodes has been accomplished by using a smaller electrode and using lower circuit densities on heavier sections.

A need remains, therefore, for a process employing a continuous electrode to be used in the field and on construction projects where it is necessary to weld in the vertical and overhead positions or in any varying position conforming to the final location of the object as well as in those situations where the workpiece is positioned for horizontal and flat position welding.

THE INVENTION

It is an object of this invention to provide a new and extended use of the welding process employing a flux-cored electrode. It is a further object to provide an electrode for out-of-position, i.e., vertical and overhead, welding.

It is still a further object of this invention to provide a small diameter flux-core wire electrode having a range of composition of the filler material to enable the electrode to be used in out-of-position welding.

It is another object of this invention to provide a fabricated wire electrode which will produce vertical-up fillet welds with minimum convexity as required for efficient use of weld metal for this type of joint and to meet industry standards.

A still further object of this invention is the provision of a process which enables the use of larger size electrodes with resulting higher deposition rates and efficiency while equaling the out-of-position characteristics of processes using smaller diameter electrodes.

These and other objects which will become apparent from the following description are achieved by the provision of a gas shielded arc welding process employing an electrode having a steel sheath enclosing a core containing a fluxing and arc stabilizing mixture. The core comprises, by weight of the core, from about 1.5 to about 4.5 percent of an alkali metal (calculated as its oxide), from about 29 to about 70 percent of titanium dioxide, from about 1.5 to about 16.5 percent silicon dioxide, from about 2.2 to about 6.6 percent manganese dioxide, from about 10 to about 20 percent ferro silicon, from about 10 to about 25 percent ferro manganese and as an optional ingredient, up to about 6 percent magnetite. These core ingredients in the range of proportions stated provide a flux of decreased fluidity relative to the fluxes of the prior art.

The electrode core material may also contain metal powder in an amount up to about 20 percent of the total core weight. The coherent metallic sheath encasing the core may amount to from about 70 to about 90 percent of the weight of the electrode.

The alkali metal is preferably sodium and is added to the core mixture as a titanate, silicate or high titania fused frit. The titanium dioxide is added as a rutile and/or high titania fused frit. Deoxidizers such as manganese and silicon are added in the form of their ferro alloys. Metal powder, if present, is added to increase the quantity of weld metal deposited or to modify its composition. The metal powder may be iron or another metal to produce an alloy deposit containing a major proportion of iron, e.g. a nickel iron alloy, or a chromium - molybdenum alloy having, for example, from about 2.25 to about 1.25 percent chromium and from about 1.0 to about 0.5 percent molybdenum.

In a preferred embodiment of the invention the fluxing ingredients of the core may comprise a portion present as fused material which may be in the form of a manufactured frit or suitable igneous minerals. A frit is made by heating to fuse titania, silica sand and manganese dioxide with sodium carbonate at approximately 1,850°F. and continuing the heating until the carbon dioxide is evolved and a glass-like product results which is crushed and screened for use. The proportions of ingredients are selected to provide a frit containing about 47 percent $TiO_2$, about 15 percent $Na_2O$, about 22 percent $MnO_2$ and about 15 percent $SiO_2$. About 1 percent of $Fe_2O_3$ may also be present. The core comprises from about 10 to about 30 percent of this fused material along with from about 25 to about 55 percent rutile, from about 10 to about 20 percent ferro silicon and from about 10 to about 25 percent ferro manganese. Optionally, the core may include up to about 12 percent silica sand, up to about 6 percent magnetite and up to about 20 percent metal powder.

To manufacture an electrode pursuant to this invention a strip of the carbon steel sheath material is formed into a U-shaped channel. The percentage of the electrode comprising the core materials may be adjusted to accommodate sheaths of varying wall thickness or by the addition of ferrous metal powder to the core or filler material. The finely divided core ingredients are deposited in the channel which is then closed by roll forming to seal them within a tubular structure preferably about 3/16 inch diameter. This preform is then reduced in diameter by a process such as drawing through progressively smaller dies to reduce its diameter. These electrodes are made in the smaller sizes such as 0.035, 0.045, 1/16 and 5/64 inch to allow the use of lower amperages for the out-of-position welding applications.

An electrode according to this invention is capable of operating at substantially higher amperages and therefore of achieving significantly greater deposition rates than those customarily achieved with electrodes of the prior art. These results are achieved in part by the core composition which develops a slag of decreased fluidity as evidenced by the ability of the operator to make a satisfactory weld at an amperage so high that an acceptable weld would usually be precluded if he were using an electrode of the prior art. This slag has a physical as well as a metallurgical function. The slag composition facilitates the production of a sound and ductile metal, and provides a weld bead of smooth shape and good appearance without undercutting. The reduction of slag fluidity may also be affected by the choice of deoxidizers. Using higher silicon contents tends to decrease fluidity while lower silicon and higher manganese contents increase fluidity. This restricted range of fluxing ingredients allows the use of high manganese to silicon ratios for improved notch toughness properties in the final weld. In the welding operation, the flux interacts with the metal to make the final slag and develop its physical and chemical characteristics.

In a preferred embodiment the electrode of this invention is employed in the welding process as a bare continuous fusible element. For welding, electric contact is made between the power source and the electrode and an arc is established between the electrode and the work which may have a coating of normal rust or mill scale. The arc is surrounded with a protective atmosphere such as carbon dioxide, a mixture of 75 percent argon with 25 percent carbon dioxide, or a mixture of argon and oxygen. The electrode is advanced into the arc while maintaining electric contact with the exterior of the electrode and the arc is moved with respect to the work.

The process is adaptable to both automatic and semi-automatic application. The fabricated tubular consumable electrode is fed continuously into the welding arc where the molten metal is protected from the surrounding atmosphere by a shielding environment developed by the decomposition of some of the fluxing ingredients in the electrode and by externally supplied gas. The gas shield protects the molten metal from the nitrogen in the air. The core materials form a protective slag cover, deoxidize and cleanse the weld metal, provide alloys for the deposit and help stabilize the arc. The dual principle for shielding gives excellent weld soundness and mechanical properties.

The invention will be better understood from the following examples which are illustrative only and not limiting.

EXAMPLE I

An electrode according to this invention was prepared having a sheath comprising 86 percent and a core 14 percent of the total electrode weight. The core comprises a granulated mixture of the following proportions:

Fused frit — 20 percent
Rutile — 44 percent
Magnetite — 6 percent
Iron powder — 5 percent
Ferro silicon — 12 percent
Ferro manganese — 13 percent Stated in another way, the core had the following approximate composition:

$Na_2O$ — 3.0 percent
$TiO_2$ — 53.4 percent
$MnO_2$ — 4.4 percent
$SiO_2$ — 3.0 percent
Magnetite — 6.0 percent
Iron powder — 5.0 percent
Ferro silicon — 12.0 percent
Ferro manganese — 13.0 percent The core mixture was enclosed within the low carbon steel sheath by methods known to the art. This assembly was drawn to 1/16 inch O.D. and used in a gas shielded arc welding torch with a carbon dioxide gas shield to make a ¼ inch fillet weld on ½ inch plate in the vertical position. For comparison, a second weld was made on a similar plate using a commercial 70 T-1, Class electrode having a diameter of 1/16 inch. In both cases the welding current was set to the condition which would permit a weld of generally accepted appearance and quality. The results are given in Table I:

TABLE I.—WELDS ON VERTICAL HALF INCH STEEL PLATE

| Condition | (a)* | | (b)* | | (a)* | | (b)* | |
|---|---|---|---|---|---|---|---|---|
|  | Maximum | | | | Optimum | | | |
| A/V** | A/v | Lbs./hr | A/v | Lbs./hr | A/v | Lbs./hr | A/v | Lbs./hr |
| Electrode 160/25 A | 160/25 | 2.5 | 200/26 | 5 | 140/25 | 1 | 170/25 | 3. |
| Electrode 200/26 of Example I | 200/26 | 5.1 | 250/27 | 8.6 | 180/26 | 4.2 | 200/26 | 5. |

*Weld type: (a) Progression with no oscillation to make a weld known in the industry as a "stringer" bead. (b) Oscillating the electrode (known as "weaving") to form a shelf of weld metal to aid in accomplishing a larger weld.
**Ampere/volts.

Table I shows a comparison of weld metal deposition rates at different currents for two types of electrodes. The increased deposition rates obtainable at higher welding currents are apparent and result in substantial economies.

EXAMPLE II

The advantages of welding with the electrode of this invention are further demonstrated by a comparison with the most common method of making out-of-position welds, i.e., by the conventional coated manual stick electrode. Table II shows a comparison of weld metal deposition rates at commonly used welding currents to produce welds on vertical plates and of the same type as previously described for Table I.

TABLE II

OUT-OF-POSITION WELDS ON HALF INCH STEEL PLATE

| Electrode | Size | Amperes | Deposition Rate (lb. per hr.) |
|---|---|---|---|
| E 6010 | 1/8" | 100 | 2.2 |
| E 6010 | 5/32 | 160 | 2.9 |
| E 6010 | 3/16 | 175 | 3.6 |
| Example 1 | 1/16 | 180 | 4.2 |

The AWS Class E 6010 has for many years been the standard for mild steel electrodes used by the construction industry, including shipyards, for out-of-position welding. The choice of electrode sizes is dependent on the thickness of the material, size of fillet required, and the skill of the welder. The 5/32 inch size is an average size and is most often used. The largest possible size allowed for out-of-position welding is the 3/16 inch size.

Highly important for comparison is the operating efficiency. The E 6010 electrodes are available only in 14 inch lengths, and after approximately 12 inches is burned, time must be allowed to change the electrode. The continuous electrode of this invention easily obtained much higher operating efficiencies.

The deposition rates shown in Table II are on the basis of 100 percent efficiency, or continuous welding. In actual practice the E 6010 coated stick electrode averages 25 percent efficiency or less because of the time involved in changing electrodes. Thus the operating efficiency for the continuous flux-cored electrode greatly exceeds that of the E 6010 type.

The properties of weld metal disposed by an electrode according to Example I are listed in Table III.

TABLE III

DEPOSITED METAL PROPERTIES

| Typical Mechanical Properties | As Welded |
|---|---|
| Yield point (psi) | 76,000 |
| Tensile strength (psi) | 90,000 |
| Elongation in 2" (%) | 27 |
| Reduction of area (%) | 62 |
| Typical Charpy V-Notch Impact Properties Test Temperature | |
| 72°F. | 66 ft.-lb. |
| 0 | 33 |

| Typical Weld Metal Analysis | | |
|---|---|---|
| Carbon | Manganese | Silicon |
| 0.08% | 1.47% | 0.74% |

The scope of this invention is not limited to depositing metal of the single analysis given in Table III but the same base flux core can be adapted to produce alloy deposits by substituting alloys for the iron added as a metal powder in the core. In Table IV are shown typical low alloy deposits which may be produced in this fashion and are suitable for welding low alloy steels of like composition or with comparable properties:

TABLE IV

LOW ALLOY DEPOSITED METAL

| Electrode | a | b | c | d | e | f |
|---|---|---|---|---|---|---|
| Carbon | 0.07 | 0.07 | 0.07 | 0.07 | 0.07 | 0.07 |
| Manganese | 0.90 | 1.00 | 1.00 | 1.00 | 1.00 | 1.00 |
| Silicon | 0.60 | 0.60 | 0.60 | 0.60 | 0.60 | 0.60 |
| Chromium | — | 1.50 | 2.25 | — | — | 0.25 |
| Nickel | — | — | — | 1.00 | 2.50 | 1.75 |
| Molybdenum | 0.50 | 0.50 | 1.00 | — | — | 0.30 |

These are typical of the low alloy types commonly available for use with the shielded metal-arc process and as listed in American Welding Society Specification A5.5.

Current and voltage settings for welding with the electrodes of this invention in various positions are listed in Table V. These results were obtained using 100 percent carbon dioxide shielding gas, dew point −40°F. When using 75 percent argon-25 percent carbon dioxide shield gas mixture, all voltages shown below are reduced by approximately 0 to 1½ volts. For most automatic operations, the amperages shown may be increased by 25 percent.

Horizontal and vertical butt welds can be made with controlled bead contour to produce flush welds or controlled reinforcement without the rough appearance usually associated with flux-cored electrode of different composition.

TABLE V

WELDING CURRENTS AND VOLTAGES

| Welding Position 0.045" diameter | Minimum Settings | Optimum Settings | Maximum Settings |
|---|---|---|---|
| Flat & Horizontal | 125 A, 24 V | 180 A, 25 V | 280 A, 30 V |
| Vertical | 125 A, 24 V | 180 A, 25 V | 210 A, 26 V |
| Overhead | 125 A, 24 V | 180 A, 25 V | 210 A, 26 V |
| Welding Position 1/16" diameter | Minimum Settings | Optimum Settings | Maximum Settings |
| Flat & Horizontal | 180 A, 26 V | 250 A, 27 V | 430 A, 34 V |
| Vertical | 180 A, 26 V | 200 A, 26 V | 250 A, 27 V |
| Overhead | 180 A, 26 V | 225 A, 26 V | 250 A, 27 V |

Clearly the electrode of this invention provides superior welding performance in all positions.

Without further explanation, it is believed one skilled in the art, from the preceding description is enable to use this invention to its fullest extent.

We claim:

1. A welding electrode having a steel sheath and a core comprising by weight of the core, from about 1.5 to about 4.5 percent of an alkali metal (calculated as its oxide), from about 29 to about 70 percent of titanium dioxide, from about 1.5 to about 16.5 percent silicon dioxide, from about 2.2 to about 6.6 percent manganese dioxide, from about 10 to about 20 percent ferro silicon and from about 10 to about 25 percent ferror manganese.

2. An electrode according to claim 1 including up to about 6 percent magnetite.

3. An electrode according to claim 1 including up to about 20 percent by weight of the core of a metal powder.

4. An electrode according to claim 1 wherein the alkali metal is sodium.

5. An electrode according to claim 1 wherein the metal sheath is a low carbon steel and comprises from about 70 to about 90 percent by weight of the electrode.

6. A welding electrode having a steel sheath and a core comprising by weight of the core from about 25 to about 55 percent titanium dioxide, from about 10 to about 20 percent ferro silicon, from about 10 to about 25 percent ferro manganese and from about 10 to about 30 percent of a fused material, said fused material comprising by weight of the fused material about 15 percent sodium oxide, about 47 percent titanium dioxide, about 22 percent manganese dioxide and about 15 percent silicon dioxide.

7. An electrode according to claim 6 including silica sand in an amount up to about 12 percent by weight of the core.

8. An electrode according to claim 6 including magnetite up to about 6 percent by weight of the core.

9. An electrode according to claim 6 including a metal powder up to about 20 percent by weight of the weight of the core.

10. An electrode according to claim 6 wherein the metal sheath is a low carbon steel and comprises from about 70 to about 90 percent by weight of the electrode.

11. An electrode according to claim 6 wherein the fused material is igneous.

* * * * *

UNITED STATES PATENT OFFICE
CERTIFICATE OF CORRECTION

Patent No. 3,800,12[?]   Dated March 26, 1974

Inventor(s) Donald C. Nelson and Robert C. Steveling

It is certified that error appears in the above-identified patent and that said Letters Patent are hereby corrected as shown below:

At line 1 of the Abstract, after "for" insert -- all position, particularly -- .

At line 2 of the Abstract, insert a comma after "head".

After the designation of the inventors, insert

-- [73] Assignee: Chemetron Corporation, Chicago, Illinois -- .

Column 1, line 45 change "circuit" to -- current -- .

Column 4, line 13 change "comprises" to -- comprised -- .

Column 5, line 33 change "disposed" to -- deposited -- .

Signed and sealed this 10th day of September 1974.

(SEAL)
Attest:

McCOY M. GIBSON, JR.        C. MARSHALL DANN
Attesting Officer           Commissioner of Patents